Feb. 15, 1966 S. FRIEDRICH 3,235,677
ARRANGEMENTS FOR LOCATING FAULTS IN COMMUNICATION LINES
Filed May 14, 1963
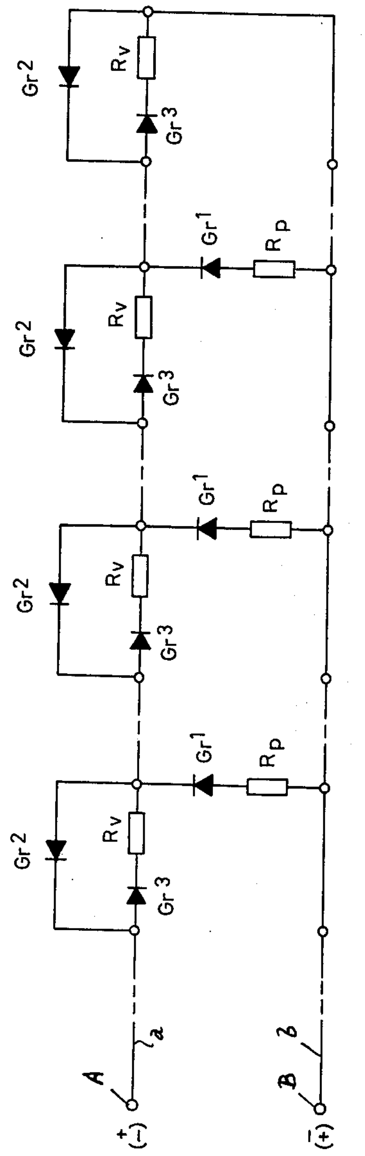
INVENTOR.
Siegfried Friedrich
BY
Michael S. Striker
Atty United States Patent Office 3,235,677
Patented Feb. 15, 1966

3,235,677
ARRANGEMENTS FOR LOCATING FAULTS IN COMMUNICATION LINES

Siegfried Friedrich, Nurnberg, Germany, assignor to Felten & Guilleaume Fernmeldeanlagen G.m.b.H., Nurnberg, Germany Filed May 14, 1963, Ser. No. 280,380
Claims priority, application Germany, May 16, 1962, F 36,813
5 Claims. (Cl. 179—175.31)

The present invention concerns a circuit arrangement adapted for locating faults in a communication line system including a plurality of unmanned repeater stations which are inserted in series-connection in the communication lines of the system for being supplied therethrough with direct current for operating the repeater amplifiers.

By the use of transistors it has been made possible to construct comparatively simple repeater stations which can be supplied with direct current from an attended station via the communication lines because the power consumption of such transistor stations is comparatively low. As a matter of fact, a plurality of unmanned repeater stations can be supplied with the required current from one attended terminal or repeater station. However, since the attended stations may be located up to 50 miles apart, means must be provided with the aid of which in the case of a failure the location of the fault or at least the line section assigned to a particular repeater and comprising the location of the fault can be determined rapidly by steps taken at one of the attended stations.

It is well known to locate a fault by resistance measurement with the aid of direct current applied by the supplying station to the remote supply circuit of the system. This method is quite suitable whenever the fault is caused by a short-circuit in the cable. However, if one or more wires of the cable are broken, then a measuring current can flow only if the repeater station amplifiers are operated in parallel connection, i.e., if these amplifiers are connected in parallel with each other between the communication and supply wires.

However, if the repeater amplifiers are supplied via a series-connection thereof, then it is necessary to provide for certain arrangements in the repeater stations by which in the case of an interruption of the cable a measuring circuit up to the location of the fault is reestablished.

There exist known circuit arrangements for this purpose which include relays. However, these relays constitute an additional load for the source of direct current supply. In addition, relays are highly impractical as components of unmanned repeater stations because the relay contacts are likely to malfunction and actually call for maintenance.

It is therefore one object of this invention to provide for an arrangement which avoids the above described difficulties and disadvantages of conventional equipment.

It is another object of this invention to provide for an arrangement as set forth which is comparatively simple and entirely reliable in operation.

With above objects in view the invention includes in a communication line system including at least two unmanned repeater stations inserted in series-connection in the communication lines of the system for being supplied therethrough with direct current for operating the repeater amplifier, a circuit arrangement adapted for locating faults in the line system, comprising for each repeater station, in combination, primary rectifier means connected in series with the repeater amplifier of the particular repeater station and being conductive only in the direction of normal direct current flow supplying said amplifier; and by-pass circuit means by-passing the series-combination formed by said primary rectifier means and said repeater amplifier and connected between the two communication lines and including secondary rectifier means non-conductive in said direction of normal direct current flow, but permitting direct current flow through said by-pass circuit means and through adjoining portions of said two communicatioin lines under exclusion of said series-combination when the direction of direct current flow through said communication lines is reversed.

The arrangement according to the invention makes it possible that also in the case of series-connection of the repeater amplifiers the location of a fault in a line section can be determined by a conventional simple resistance measurement even if the communication line is interrupted at the location of the fault. The arrangement according to the invention entails the remarkable advantage in comparison to known similar arrangements comprising relays, that in the unmanned repeater stations and amplifiers only simple and reliable electronic components are needed which do not require any maintenance and which do not include relays so that in this manner the source of direct current supply does not have to carry any additional load.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which a circuit diagram of an embodiment of the invention is illustrated.

The drawing illustrates in a schematic manner a communication system comprising a plurality of repeater stations and being supplied at the terminals A and B with direct current as will be explained further below. In the four repeater stations illustrated the repeater amplifiers connected in series with each other in the one communication line *a* are represented by the resistors $R_v$ so that all these repeater station amplifiers can be supplied with direct current flowing in a predetermined direction through the lines *a* and *b*, i.e., between the terminals A and B provided that a positive potential is applied to the terminal A.

It does not require any detailed description for understanding that in the case of a short circuit between the lines *a* and *b* the location of this fault can be determined in conventional manner by measuring the resistance between the terminals A and B assumed to be located at the current supplying station. However, in doing this the voltage used in the resistance measurement may be of the same polarity as the above mentioned supply current, i.e., in the present example positive at the terminal A.

It is to be expected that particularly in the case of cables which are exposed to outside influences a fault will more frequently be caused by a breakage of the cable than by a short circuit. If one would proceed with the resistance measurement in the same manner as described above, in the contemplated case of a cable break an extremely high resistance would be measured. This would only indicate that a break of the cable exists but it would not tell anything about the location of the fault. Now, in accordance with the invention and with the aid of the circuit arrangement according to the invention the location of the fault can be carried out simply by reversing the polarity of the direct current supply and by thereby reversing the direction of the direct current flow in the system.

As can be seen from the drawing, in each repeater station a rectifier $Gr^3$ is connected in series with the particular repeater amplifier $R_v$, this rectifier being conductive only in the direction of the normal direct current flow supplying the amplifier. Additionally, a by-pass circuit is provided which by-passes the just described series-combination of the amplifier $R_v$ and rectifier $Gr^3$, and also connects the communication lines *a* and *b*. This by-pass circuit comprises a rectifier $Gr^1$ connected between the lines *a* and *b*, and a further rectifier $Gr^2$ connected as a shunt relative to the above mentioned series-combination. Preferably the by-pass circuit also comprises a resistor $R_p$ which will be described further below. It is of importance to note that the two rectifiers $Gr^1$ and $Gr^2$ are both so arranged that they are non-conductive for the normal direction of direct current flow from terminal A to terminal B.

It will be readily understood that a measuring current applied with opposite polarities as indicated by the negative sign at terminal A and the positive sign at terminal B and thus flowing in opposite direction will find a path at every repeater station through the respective rectifier $Gr^1$. Consequently, a conventional resistance measurement can be carried out by the supplying station with the aid of a current flowing therethrough in a loop extending up to that line section where the cable connection is interrupted. Of course, during this resistance measurement all the repeater amplifiers are blocked by the respective rectifiers $Gr^3$, and the individual series-combination of amplifier and rectifier in each involved repeater station is shunted by the respective rectifier $Gr^2$.

It should be noted that in this arrangement the components of the amplifiers are protected during the measuring action against the application of a voltage of a polarity which is opposite to that normally applied from the terminal A. In addition the same components are even protected against damage which may occur if inadvertently for any reason the wrong polarity is applied to terminal A which can easily occur, e.g., in the case of mobile installations.

The above mentioned resistors $R_p$ serve for allocating specific resistance values to the application of a measuring voltage or current. In order to render the measuring operation as independent as possible from substantial variations of the resistors of the rectifiers in conductive direction, it is advisable to select for the resistors $R_p$ a resistance value which is considerably larger than the resistances of the rectifiers $Gr^1$ and $Gr^2$, or both combined. For example, the resistance of a resistor $R_p$ should be at least 10 times the combined resistance of the resistors $Gr^1$ and $Gr^2$. The result of this is that in most cases the resistance of the resistor $R_p$ will also exceed substantially the resistance of one loop of the lines *a* and *b* between two unmanned repeater stations so that in this manner the resistance measurement for the purpose of fault location is rendered independent of the lengths of the cable sections between the individual repeater stations.

The source of direct current for carrying out the resistance measurement for the purpose of fault location may be the same source which ordinarily supplies the repeater amplifiers. It is advisable to provide this source with means whereby the magnitude of the current is kept at a constant value. In that case the resistance of the measuring circuit can be determined directly at the terminals A and B of the constant current supply source by direct voltage measurement.

The cross-connections located in each repeater station between the lines *a* and *b* and consisting of a series-combination of a rectifier $Gr^1$ and a resistor $R_p$ may be arranged at the input end of the repeater amplifier as well as at the output end thereof as illustrated in the drawing.

It will be understood that each of the elements described above, or two or more together, may also find a useful application in other types of a circuit arrangement adapted for locating faults in a communication line system differing from the types described above.

While the invention has been illustrated and described as embodied in a circuit arrangement adapted for locating faults in a communication line system including at least two unmanned repeater stations inserted in series-connection in one of two communication lines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a communication line system including at least two unmanned repeater stations inserted in series-connection in the communication lines of the system for being supplied therethrough wtih direct current for operating the repeater amplifier, a circuit arrangement adapted for locating faults in the line system, comprising for each repeater station, in combination, primary rectifier means connected in series with the repeater amplifier of the particular repeater station and being conductive only in the direction of normal direct current flow supplying said amplifier; and by-pass circuit means by-passing the series-combination formed by said primary rectifier means and said repeater amplifier and connected between the two communication lines and including secondary rectifier means non-conductive in said direction of normal direct current flow, but permitting direct current flow through said by-pass circuit means and through adjoining portions of said two communication lines under exclusion of said series-combination when the direction of direct current flow through said communciation lines is reversed.

2. In a communication line system including at least two unmanned repeater stations inserted in series-connection in the communication lines of the system for being supplied therethrough with direct current for operating the repeater amplifier, a circuit arrangement adapted for locating faults in the line system, comprising for each repeater station, in combination, a first rectifier means connected in series with the repeater amplifier of the particular repeater station and being conductive only in the direction of normal direct current flow supplying said amplifier; a cross-circuit connected between the two communication lines and including second rectifier means non-conductive in said direction of said normal direct current flow; and third rectifier means connected in parallel with the series-combination formed by said first rectifier means and said amplifier for shunting said series-combination, said third rectifier means being non-conductive in said direction of said normal direct current flow, so that when voltage is applied to said two communication lines causing direct current flow in direction opposite to said normal direct current flow direction, no direct current will pass through said first rectifier means and said amplifier, but direct current will pass between said two communication lines through said second and third rectifier means.

3. In a communication line system including at least two unmanned repeater stations inserted in series-connection in the communication lines of the system for being supplied therethrough with direct current for operating the repeater amplifier, a circuit arrangement adapted for locating faults in the line system, comprising for each repeater station, in combination, a first rectifier means connected in series with the repeater amplifier of the particular repeater station and being conductive only in the direction of normal direct current flow supplying said amplifier; a cross-circuit connected between the two communication lines and including second rectifier means non-conductive in said direction of said normal direct current flow and resistor means connected in series with said second rectifier means; and third rectifier means connected in parallel with the series-combination formed by said first rectifier means and said amplifier for shunting said series-combination, said third rectifier means being non-conductive in said direction of said normal direct current flow, so that when voltage is applied to said two communication lines causing direct current flow in direction opposite to said normal direct current flow direction, no direct current will pass through said first rectifier means and said amplifier, but direct current will pass between said two communication lines through said second and third rectifier means.

4. In a communication line system including at least two unmanned repeater stations inserted in series-connection in the communication lines of the system for being supplied therethrough with direct current for operating the repeater amplifier, a circuit arrangement adapted for locating faults in the line system, comprising for each repeater station, in combination, a first rectifier means connected in series with the repeater amplifier of the particular repeater station and being conductive only in the direction of normal direct current flow supplying said amplifier; a cross-circuit connected between the two communication lines and including second rectifier means non-conductive in said direction of said normal direct current flow and resistor means connected in series with said second rectifier means and having a resistance considerably exceeding that of said second rectifier means in current passing direction; and third rectifier means connected in parallel with the series-combination formed by said first rectifier means and said amplifier for shunting said series-combination, said third rectifier means being non-conductive in said direction of said normal direct current flow, so that when voltage is applied to said two communication lines causing direct current flow in direction opposite to said normal direct current flow direction, no direct current will pass through said first rectifier means and said amplifier, but direct current will pass between said two communication lines through said second and third rectifier means.

5. A circuit arrangement as claimed in claim 4, wherein said resistor means have a resistance considerably exceeding the combined resistance of said second and third rectifier means in current passing direction.

No references cited.

ROBERT H. ROSE, *Primary Examiner.*